US011533322B2

(12) United States Patent
Vargas Martinez et al.

(10) Patent No.: US 11,533,322 B2
(45) Date of Patent: Dec. 20, 2022

(54) METHOD FOR DETECTING ATTACKS ON A NETWORK COMPONENT OF AN INDUSTRIAL NETWORK

(71) Applicant: Robert Bosch GmbH, Stuttgart (DE)

(72) Inventors: Cyntia Vargas Martinez, Karlstadt (DE); Birgit Vogel-Heuser, Garching (DE); Julien Rausch, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 16/792,564

(22) Filed: Feb. 17, 2020

(65) Prior Publication Data
US 2020/0280569 A1 Sep. 3, 2020

(30) Foreign Application Priority Data
Feb. 28, 2019 (DE) .................... 10 2019 105 139.8

(51) Int. Cl.
*H04L 9/40* (2022.01)
*H04L 41/0866* (2022.01)
*H04L 41/0816* (2022.01)
*H04L 67/12* (2022.01)

(52) U.S. Cl.
CPC ...... *H04L 63/1416* (2013.01); *H04L 41/0816* (2013.01); *H04L 41/0866* (2013.01); *H04L 63/1466* (2013.01); *H04L 63/20* (2013.01); *H04L 67/12* (2013.01)

(58) Field of Classification Search
None
See application file for complete search history.

(56) References Cited

U.S. PATENT DOCUMENTS

| 2008/0126377 | A1* | 5/2008 | Bush .................... G06F 21/552 |
| 2009/0122784 | A1 | 5/2009 | Lei |
| 2009/0271504 | A1* | 10/2009 | Ginter ................... H04L 63/02 709/220 |
| 2009/0273471 | A1* | 11/2009 | Pellegrino ............ G08B 29/186 340/540 |
| 2015/0135263 | A1 | 5/2015 | Singla et al. |
| 2017/0264628 | A1 | 9/2017 | Treat et al. |
| 2018/0077178 | A1 | 3/2018 | Beauchesne et al. |

* cited by examiner

*Primary Examiner* — Sm A Rahman
*Assistant Examiner* — Emad Siddiqi
(74) *Attorney, Agent, or Firm* — Maginot, Moore & Beck LLP

(57) ABSTRACT

A method for detecting attacks on a network component of an industrial network uses a component monitoring unit integrated in the network component. The component monitoring unit has at least one checking module for performing a check on the network component and a communication module for the component monitoring unit to communicate with at least one further network component of the industrial network. The component monitoring unit further has a management module for managing a communication between the at least one checking module and the communication module. When a predetermined criterion is satisfied, the at least one checking module collects and/or evaluates information concerning the network component and/or concerning the satisfied criterion for the purpose of checking the network component.

15 Claims, 5 Drawing Sheets

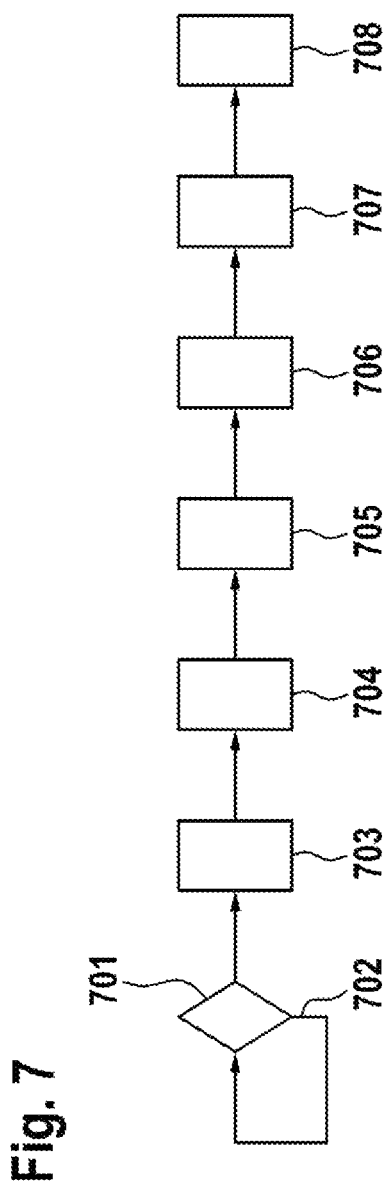

METHOD FOR DETECTING ATTACKS ON A NETWORK COMPONENT OF AN INDUSTRIAL NETWORK

This application claims priority under 35 U.S.C. § 119 to patent application no. DE 10 2019 105 139.8, filed on Feb. 28, 2019 in Germany, the disclosure of which is incorporated herein by reference in its entirety.

The disclosure relates to a method for detecting attacks on a network component of an industrial network and to a computing unit and a computer program for performing said method.

BACKGROUND

What are known as industrial networks can be used to network a multiplicity of different components of an industrial installation to one another in order to operate such an installation in automated fashion, for example, or to monitor such an installation by using remote computing units. Network components networked to one another can be field devices, for example sensors, actuators, drives, feelers, probes and switches, or control units such as programmable logic controllers (PLCs), CNC (computerized numerical control) controllers, NC (numerical control) controllers, motion logic controllers (MC—motion control), etc., or else further computing units such as PCs, smart devices, servers, etc. Such control units can form what is known as an embedded system in this case, that is to say a computer system comprising hardware and software that is embedded in a complex technical environment and can undertake control, automatic-control and data processing tasks in particular in real time.

In order to be able to ensure security and protection of know-how, it is important to be able to monitor industrial installations or industrial networks of this kind for attacks.

SUMMARY

According to the disclosure, a method for detecting attacks on a network component of an industrial network and also a computing unit and a computer program for performing said method having the features of the independent patent claims are proposed. Advantageous refinements are the subject of the subclaims and of the description below.

The present method involves the network component of the industrial network being monitored by using a component monitoring unit integrated in the network component. The component monitoring unit has at least one checking module, a communication module and a management module.

The at least one checking module is intended and geared to perform a check on the network component. In particular, there may be provision for multiple checking modules that can each expediently perform a check on the network component in different ways or each using a specific method.

The communication module is intended and geared for communication or data interchange between the component monitoring unit and at least one further network component of the industrial network. In particular, the communication module is geared to receive requests or demands from further network components and to transmit information, in particular results relating to demands from the checking modules, to further network components of the network.

The management module is intended and geared to manage a communication or a data interchange between the at least one checking module and the communication module. For this purpose, the management module interprets data or information transsmitted from the respective modules and decides what action is supposed to be performed on receiving these data.

The present method involves the at least one checking module performing a check on the network component if a predetermined criterion is satisfied. For this purpose, the at least one checking module collects and/or evaluates information concerning the network component and/or concerning the satisfied criterion. A result of this performed check is transmitted from the at least one checking module to the communication module via the management module and is transmitted from the communication module to a further network component of the industrial network in particular for the purpose of further evaluation.

This further network component can be for example a superordinate control unit that can be used for example for the purpose of configuring or managing the network and the network components thereof. By way of example, it can be a server, a PC, or the like. By way of example, the result determined for the check by the individual checking modules can be that there is a suspicion of a possible attack or an event indicating an attack. The further network component can then evaluate the applicable event in detail to ascertain whether there is actually an attack and, if so, can initiate applicable countermeasures.

The present method provides a way of performing monitoring for attacks in network components themselves. The component monitoring unit and in particular the checking modules thereof can expediently be configured so as to allow individually tailored, as effective as possible attack detection for the respective network component. The modular design of the component monitoring unit allows flexible development and matching to the specific network component that is to be monitored. Individual modules can be specifically matched to the network component to be monitored, for example to the specific properties or the specific processes to be monitored for the network component. Further, a simple way of upgrading the component monitoring unit or of retrospectively adapting and extending it in a flexible and simple manner after it has been integrated into the network component is provided. By way of example, new modules for performing new, additional functions can be introduced into the component monitoring unit. There is therefore for example the possibility of reacting to new vulnerabilities and of fixing them or implementing protection from new, hitherto unknown types of attacks. Similarly, modules can be removed from the component monitoring unit or replaced if the functions thereof are no longer needed, for example. Further, individual modules and the functions thereof can also be flexibly deactivated, for example in order to save resources, and reactivated again at a later time when required.

The component monitoring unit is in particular in the form of software executed in the network component to be monitored, expediently under the operating system thereof. The component monitoring unit and the applicable processes thereof can operate in particular independently and in parallel with firmware of the network component. The modules of the component monitoring unit are accordingly in particular in the form of individual software modules. In particular, processes of the component monitoring unit can be executed in resource-saving fashion, so that only comparatively little computing capacity of the network component is used.

The operating system executed by the network component can in particular be a realtime-compatible operating system, so that the network component can undertake control, automatic-control and data processing tasks in the industrial network in particular in real time. The processes of the component monitoring unit can in particular be incorporated into a trace log of the realtime-compatible operating system, in particular such that the realtime behavior of the network component is not adversely affected. By way of example, the processes of the component monitoring unit can be executed as comparatively low-priority processes so that the execution of higher-priority processes for realtime control, realtime automatic control and realtime data processing is not hampered.

As a result of the integration of the component monitoring unit into the network component to be monitored, the network component can expediently monitor itself and independently detect attacks or at least potential attacks, and expediently react thereto, of its own accord. The present method therefore involves network components being monitored in particular not by means of monitoring units in the form of independent hardware units or network components. The present method can therefore allow protection of the network component from attacks even if for example a separate monitoring unit of this kind were not accessible, for example because a communication connection to this separate monitoring unit is broken on account of a defect, maintenance or an attack.

The industrial network can be protected by the present method in particular from attacks from the inside. Conventionally, industrial networks are protected from attacks from outside, that is to say from attacks in which an attempt is made from network-extraneous computing units, which are not part of the network, to gain access to the network, by protective measures such as firewalls, etc. During attacks from inside, however, an attacker has already overcome protective measures of this kind such as firewalls. By way of example, such attacks from inside can involve situations in which a user (intentionally or unintentionally) introduces harmful software into a network component or a network component is manipulated by a user at hardware level and/or software level. Integrating the component monitoring unit into network components also allows such attacks to be detected, however. Expediently, a component monitoring unit can be integrated into each of a multiplicity of network components of the network in an appropriate manner in order to effectively protect the network and the individual components thereof from attacks.

In particular, the industrial network networks a multiplicity of components of an industrial installation to one another, in particular field devices, such as sensors, actuators, drives, feelers, probes and switches, etc., and, further, in particular control units, for example programmable logic controllers (PLCs), CNC (computerized numerical control) controllers, NC (numerical control) controllers, motion logic controllers (MC—motion control), etc. In particular, the method is suitable for monitoring network components in the form of computing or control units, particularly for embedded systems, which are used to perform in particular control, automatic-control and data processing tasks in the network in real time. The method therefore provides a way for an embedded system in an industrial network to monitor itself for attacks. This allows the security of the entire industrial network or of the entire installation to be increased.

Advantageously, the predetermined criterion is satisfied if the communication module receives a request to perform a check and if the management module advantageously determines that this request is admissible. The check can therefore be triggered from outside by a further network component, for example by a superordinate control unit. In particular, the management module is for this purpose geared to check and verify data, information and requests transmitted by further network components for admissibility. If the management module rates a request received from outside as inadmissible, the request is in particular rejected. If, on the other hand, the request is verified as admissible, the request is expediently forwarded to the relevant module.

Alternatively or additionally, the predetermined criterion is advantageously satisfied if a predetermined time interval elapses. The check can therefore be performed regularly in prescribed or prescribable time intervals, for example in accordance with a checking schedule.

Alternatively or additionally, the predetermined criterion may advantageously also be satisfied when a predetermined time arrives. The check can therefore expediently be performed at firmly prescribed times, for example every day at a specific time.

Alternatively or additionally, the predetermined criterion is advantageously satisfied if a security-critical event occurs. A security-critical event of this kind should be understood to mean in particular an event that indicates an attack or a potential attack or an anomaly, that is to say a conspicuous behavior of the network component that differs from a normal behavior to be expected. By way of example, the component monitoring unit can observe the behavior of the network component, and an active check can be triggered on detection of an applicable security-critical event. By way of example, a security-critical event of this kind can be unauthorized memory access, an irregular behavior of a memory unit, an increased consumption of a memory unit, an increased computing time requirement, etc.

In accordance with one preferred refinement, the at least one checking module has an audit module. To perform the check on the network component, this audit module preferably collects information concerning the network component. The evaluation of this information allows ascertainment of whether there is or at least could be an attack. The evaluation of this information can be performed by the audit module itself or by another network component. This information can be in particular information concerning the current operation of the network component, in particular information concerning a configuration, components, executed processes and/or a performance measure (measurements relating to computing resources that describe the current process or state of a component) of the network component. Information can in particular be evaluated on the basis of prescribed security guidelines, expediently in order to rate whether these security guidelines are complied with or whether there is a violation or potential violation of the guidelines. The result determined for this check by the audit module can in particular be whether or not there is an attack or a potential attack.

Alternatively or additionally, the at least one checking module has, in accordance with one preferred refinement, a log conditioning module that collects and conditions information concerning the network component for the purpose of performing the check on the network component. Preferably, the log conditioning module collects and conditions information concerning the network component that has been obtained during a logging. For this purpose, the log conditioning module collects in particular information from different log files, e.g. from system, security, application, process and diagnosis logs, and conditions said information accordingly.

Advantageously, the at least one checking module has an event module and an analysis module. The event module preferably monitors whether a security-critical event occurs. As explained above, a security-critical event of this kind should be understood to mean in particular an event that indicates an (potential) attack or an anomaly. When the security-critical event occurs, the event module preferably collects information concerning this security-critical event. The event module can in particular collect applicable information itself, for example by observing a behavior or specific attributes of the network component. Alternatively or additionally, the event module receives information concerning the event that has occurred from components of the network component. For this purpose, the event module can for example request the applicable information from the respective components, for example by means of what is known as a callback function and/or an interprocess communication (IPC). This collected or received information is expediently forwarded from the event module to the analysis module. Preferably, the analysis module evaluates this information concerning the security-critical event. By way of example, the analysis module can evaluate the information on the basis of prescribed security guidelines, expediently in order to rate whether there is or could be an attack. In particular, the result produced for the evaluation can be an alarm if there is a suspicion of an attack. By way of example, a suspicion of this kind can result in the analysis module also requesting a further, more detailed check, for example a check by the audit module.

In accordance with one preferred refinement, the component monitoring unit further has a configuration module for configuring the at least one checking module and/or the management module. In particular, the configuration module can configure what functions the individual modules of the component monitoring unit are supposed to perform, for example what information the audit, log conditioning and event modules are supposed to collect or the occurrence of what specific security-critical events the event module is supposed to monitor. Further, the configuration module can in particular stipulate parameters of these functions and for example define applicable security guidelines with which information is supposed to be compared.

Advantageously, the component monitoring unit further has a configuration data module in which configuration data are stored. Preferably, the configuration module configures the at least one checking module and/or the management module on the basis of these configuration data stored in the configuration data module. The configuration data module can in particular be a nonvolatile memory unit or a nonvolatile memory area, which means that the configuration data can be stored permanently therein. By way of example, the configuration data can be stored in the configuration data module by a manufacturer for an initial configuration or startup of the component monitoring unit. In particular, the configuration data can comprise security guidelines for the individual modules.

As an alternative or in addition to such a configuration by means of configuration data prescribed a priori, one advantageous refinement involves a configuration being made possible from outside at runtime or during regular operation of the component monitoring unit. For this purpose, the management module preferably further manages a communication or a data interchange between the configuration module and the communication module. If the communication module receives a request to perform a configuration of the component monitoring unit along with applicable configuration data and if the management module determines that this request is admissible, the configuration module preferably configures the at least one checking module and/or the management module on the basis of the received configuration data. A further network component, for example a superordinate control unit, can therefore transmit configuration data to the component monitoring unit, based on which configuration data the modules of the component monitoring unit can be reconfigured. By way of example, these transmitted configuration data can comprise new or revised security guidelines, for example in order to fix existing vulnerabilities or to be able to detect new, hitherto unknown types of attacks.

Preferably, the communication module stores the received configuration data in the configuration data module. The received new configuration data are therefore available should fresh configuration be necessary.

Preferably, an alarm is produced and/or an error log is created and/or a request to perform an audit is output in the course of the monitoring of the network component, in particular in the event of a detected attack or a suspicion of an attack. In particular, such reactions to potential attacks can be flexibly adapted and for example can actively release triggers. The further network component can react to such alarms, error logs and requests by expediently checking whether there is actually an attack.

The method is suitable for a wide bandwidth of industrial networks or accordingly networked industrial installations, for example for tunnel drilling machines, hydraulic punches/presses, general automations, semiconductor handling, robotics, etc. The method is particularly suitable for machine tools, such as for example a welding system, a screwing system, a wire saw or a milling machine, or a web processing machine, such as e.g. a printing machine (e.g. newspaper printing machine, intaglio printing machine, screen printing machine, inline flexographic printing machine) or a packaging machine, or a (belt) installation for manufacturing an automobile or for manufacturing components of an automobile (e.g. internal combustion engines or controllers).

A network component according to the disclosure, e.g. a computing unit such as a controller of a printing machine, is geared, in particular by programming, to perform a method according to the disclosure.

The implementation of a method according to the disclosure in the form of a computer program or computer program product having program code for performing all the method steps is also advantageous, since this gives rise to particularly low costs, in particular if an executing controller is also used for other tasks and is therefore available anyway. Suitable data carriers for providing the computer program are in particular magnetic, optical and electrical memories, such as e.g. hard disks, flash memories, EEPROMs, DVDs and more besides. It is also possible for a program to be downloaded via computer networks (Internet, intranet, etc.).

Further advantages and refinements of the disclosure are obtained from the description and the accompanying drawing.

It goes without saying that the features cited above and those yet to be explained below are usable not only in the respectively indicated combination but also in other combinations or on their own without departing from the scope of the disclosure.

The disclosure is depicted schematically on the basis of exemplary embodiments in the drawing and is described thoroughly below with reference to the drawing.

BRIEF DESCRIPTION OF THE FIGURES

FIG. 7 a preferred embodiment of the method according to the disclosure as a block diagram.

DETAILED DESCRIPTION

Figure 1:
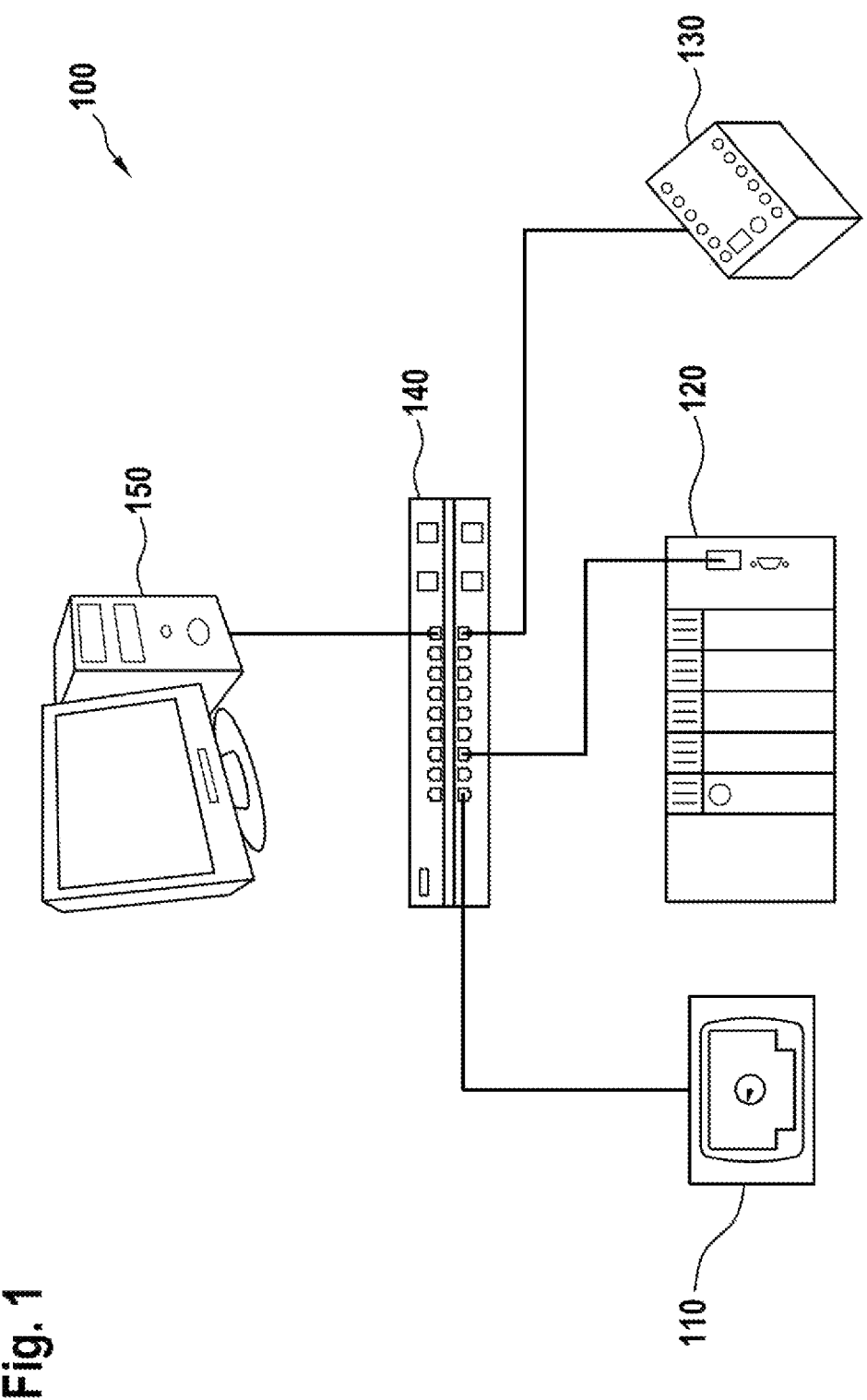
FIG. 1 schematically shows an industrial network that forms the basis for a preferred embodiment of the method according to the disclosure.

FIG. 1 schematically depicts an industrial network, denoted by 100. The industrial network 100 networks a multiplicity of different network components of an industrial installation to one another. By way of example, such an installation can be a processing machine. The network can in particular be Ethernet-based.

In the example shown in FIG. 1, the network components depicted are for example a control panel 110, a programmable logic controller (PLC) 120 and a controller 130, which are networked to a superordinate control unit 150 in the form of a PC via a network distributor 140 (e.g. what is known as a switch).

It goes without saying that the network 100 can also comprise further network components. By way of example, the control panel 110, the PLC 120 and the controller 130 can each expediently be networked to field devices such as sensors, feelers, switches, motors and actuators, etc., in order to control them. In particular, these field devices can be used to perform a manufacturing or machining process on the processing machine. Further, the control unit 150 can be connected to further, in particular superordinate, computing units, for example to PCs, servers and remote computing units, for example in the spirit of what is known as "cloud computing".

In particular, the control panel 110, the PLC 120 and the controller 130 are each in the form of what is known as an embedded system in order to perform control, automatic-control and data processing tasks in real time and in order to automatically control the applicable field devices and hence the manufacturing or machining process in real time. For this purpose, a realtime-compatible operating system is expediently executed in each of the embedded systems 110, 120 and 130.

In order to ensure security and protection of know how for the processing machine and in order to protect the machine or the network 100 from attacks, a preferred embodiment of the disclosure involves a respective component monitoring unit being integrated in each of the embedded systems 110, 120 and 130 in order to monitor the respective network component 110, 120 and 130 for attacks. These component monitoring units are each in the form of software that is executed in the respective network component 110, 120 and 130 to be monitored, under the realtime-compatible operating system thereof.

Figure 2:
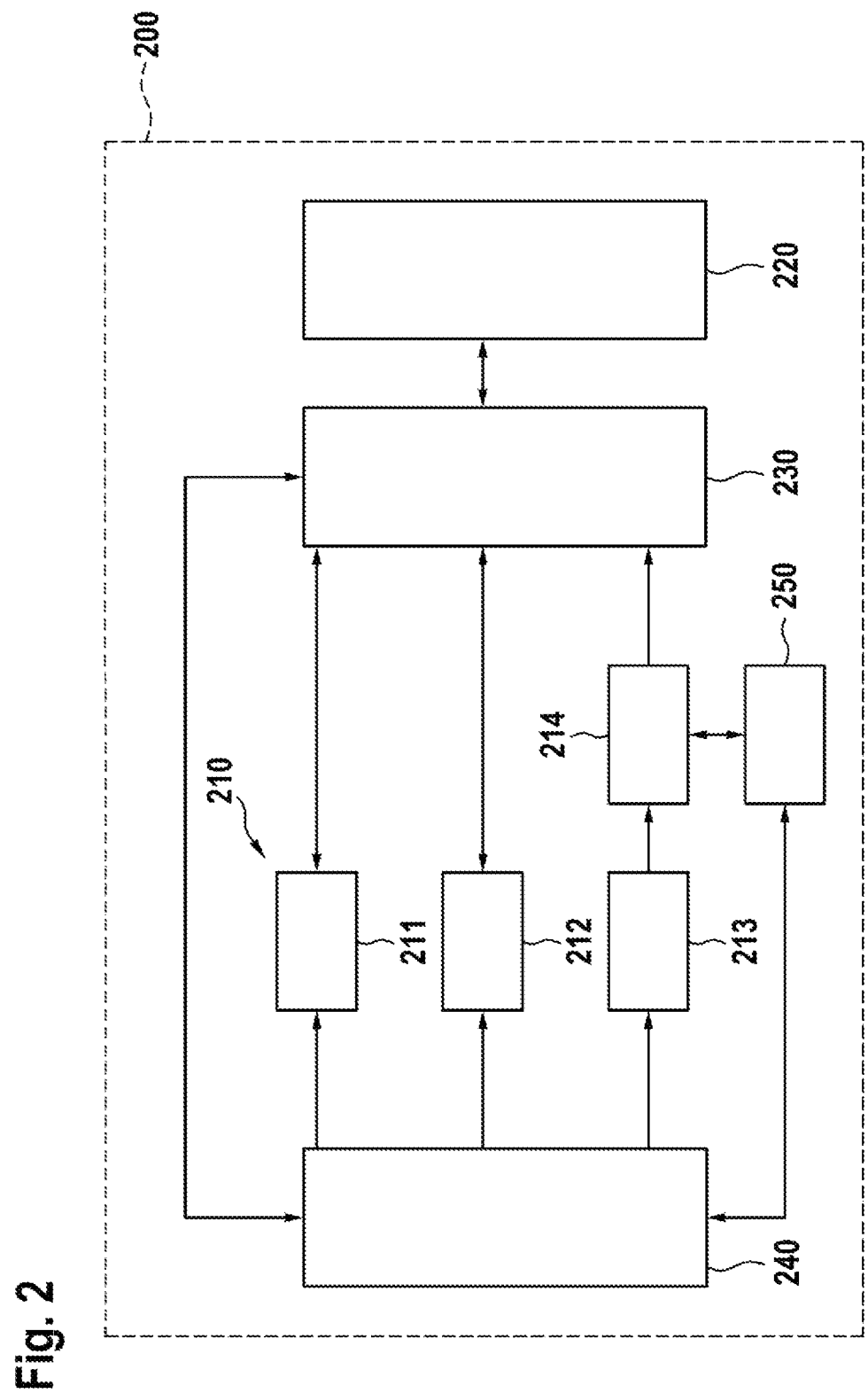
FIG. 2 schematically shows a component monitoring unit for a network component that is geared to perform a preferred embodiment of the method according to the disclosure.

FIG. 2 schematically depicts a component monitoring unit of this kind in accordance with a preferred embodiment of the disclosure, said component monitoring unit being denoted by 200.

The case in which the component monitoring unit 200 is integrated in the PLC 120 will be considered below in exemplary fashion. The explanations that follow are likewise supposed to apply to the network components 110 and 130 accordingly, however.

The component monitoring unit 200 is of modular design, individual modules being in the form of software modules that are executed in the PLC 120 under the respective operating system. In the example depicted, the component monitoring unit 200 has a multiplicity of checking modules 210, a communication module 220, a management module 230, a configuration module 240 and a configuration data module 250.

The checking modules 210 are each geared to perform a check on the network component 120. The communication module 220 is geared for communication or for bilateral data interchange between the component monitoring unit 200 with further network components of the network 100, in particular the superordinate control unit 150. In this case, the communication module 220 is in particular geared to receive requests or demands from the control unit 150 and to transmit results of the check on the checking modules 210 to the control unit 150.

The configuration module 240 is geared to configure the modules 210, 220, 230. For this purpose, applicable configuration data may be stored in the configuration data module 250, which can be in the form of an area of a nonvolatile memory of the PLC 120 that is reserved for the component monitoring unit 200, for example. Further, the superordinate control unit 150 can also transmit configuration data to the component monitoring unit 200, which configuration data can be used by the configuration module 240 to configure the modules 210, 220, 230.

The management module 230 is intended to manage a communication or a data interchange between the communication module 220, on the one hand, and the checking modules 210 and the configuration module 240, on the other hand. For this purpose, the management module 230 interprets data transmitted from the respective modules 210, 220, 240 and decides what action needs to be performed on reception of these data. By way of example, the management module 230 checks requests from further network components that are received on the communication module 220. If the management module 230 rates a received request as inadmissible, said request is rejected. If, on the other hand, the request is verified as admissible, this request is expediently forwarded from the management module 230 to the relevant module.

In the example shown, the checking modules 210 provided are an audit module 211, a log conditioning module 212 and also an event module 213 and an analysis module 214. To perform the check on the PLC 120, the audit module 211 collects information concerning the PLC 120 and evaluates this information to ascertain whether there is or at least could be an attack. This information can be information concerning the current operation of the PLC 120, e.g. information concerning a configuration, components, processes carried out and a performance measure of the PLC 120. The information is in particular evaluated on the basis of prescribed security guidelines that are stored in the configuration data module 250, for example. The protocol conditioning module 212 collects information from various log files of the PLC 120, e.g. information from system, security, application, process and diagnosis logs, and conditions it accordingly.

The event module 213 monitors whether a security-critical event occurs that indicates a (potential) attack or an anomaly. By way of example, this security-critical event can be an unauthorized memory access, an irregular behavior of a memory unit, an increased consumption of a memory unit, an increased computing time requirement of the PLC 120. When a security-critical event of this kind occurs, the event module 213 collects information concerning this event, e.g. by means of a callback function or an interprocess communication. This collected or received information is forwarded from the event module 213 to the analysis module 214 and evaluated by the latter, in particular on the basis of prescribed security guidelines, which can be stored in the configuration data module 250.

The text below refers to FIGS. 3 to 7 to provide an exemplary explanation of how the PLC 120 can be monitored for attacks by the component monitoring unit 200 as part of the present method, FIGS. 3 to 7 each schematically depicting a preferred embodiment of the method according to the disclosure as a block diagram.

Figure 3:
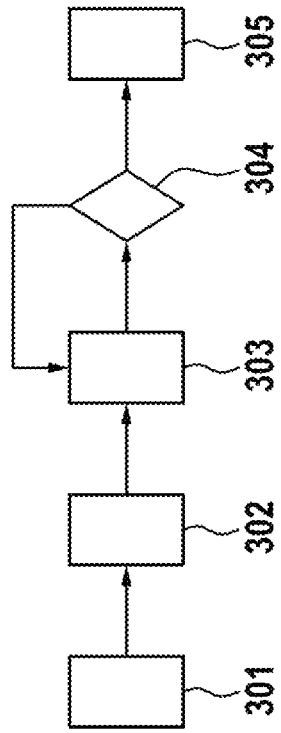
FIG. 3 a preferred embodiment of the method according to the disclosure as a block diagram.

FIG. 3 depicts the case in which the component monitoring unit is configured for the first time.

In step 301, the component monitoring unit 200 or the applicable software is introduced into the PLC 120. In step 302, the configuration module 240 reads in the configuration data stored in the configuration data module 250 and verifies them. Following successful verification, the configuration module 240 configures the remainder of the modules in step 303 and in particular distributes the applicable configuration data to the respective associated modules.

By way of example, the configuration module 240 transmits configuration data to the management module 230 concerning admissible communications or admissible data interchanges with further network components. On the basis of these data, the management module 230 can in turn configure the communication module 220. By way of example, these configuration data can be admissible message formats, communication logging, requests, etc.

Further, the configuration module 240 can transmit to each of the audit module 211 and the log conditioning module 212 configuration data concerning the network component 120 to be monitored and also concerning a predetermined time interval after the expiry of which the audit module 211 and the log conditioning module 212 are each supposed to perform a check or conditioning.

The configuration module 240 transmits to the event module 213 for example configuration data concerning the security-critical events and further concerning the way in which the event module 213 is supposed to perform the monitoring for the security-critical event, for example a monitoring interval or monitoring techniques.

In step 304, the configuration module 240 checks whether the configuration of the modules was successful. If not, the configuration is repeated in accordance with step 303. Successful configuration results in the component monitoring unit 200 being started up in step 305. In particular, the further embedded systems 110 and 130 can be configured analogously to the PLC 120.

Figure 4:
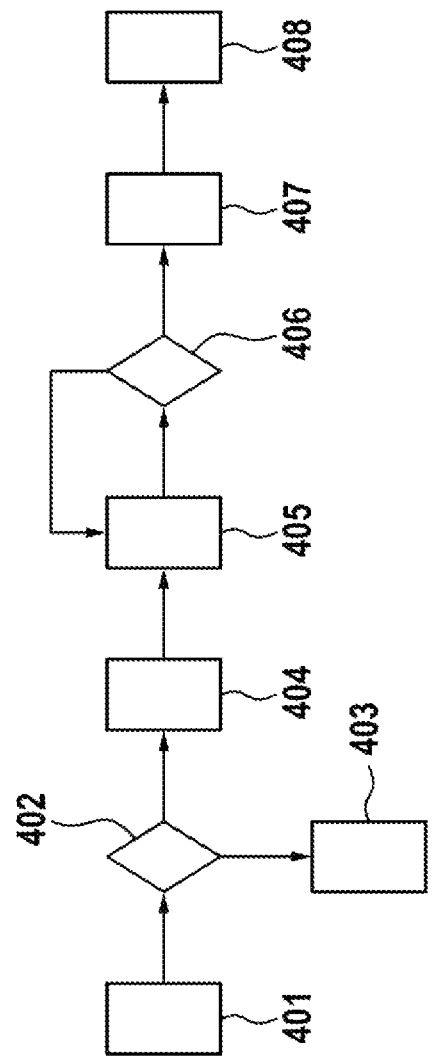
FIG. 4 a preferred embodiment of the method according to the disclosure as a block diagram.

The component monitoring unit 200 does not just allow simple automatic configuration on startup; fresh configuration at the runtime of the component monitoring unit 200 or of the PLC 120 by further network components, in particular by the superordinate control unit 150, is also rendered possible. Such a case is depicted in FIG. 4.

In this case, the communication module 220 receives a configuration request and new configuration data from the control unit 150 in step 401. This received configuration request is checked by the management module 230 in step 402.

If the management module 230 determines that the configuration request is inadmissible, the request is rejected in step 403 and returned to the control unit 150. If, on the other hand, the request is detected as admissible, the management module 230 transmits the request to the configuration module 240 in step 404. In step 405, the configuration module 240 then configures the further modules, as per step 303 explained above. In step 406, the configuration module 240 checks, analogously to step 304, whether the configuration was successful. If this was the case, the configuration module 240 stores the new configuration data in the configuration data module 250 in step 407. In step 408, the configuration is complete and the reconfigured component monitoring unit 200 is started up.

Figure 5:
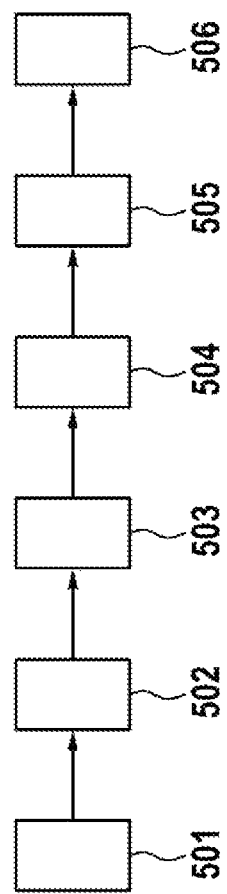
FIG. 5 a preferred embodiment of the method according to the disclosure as a block diagram.
Figure 6:
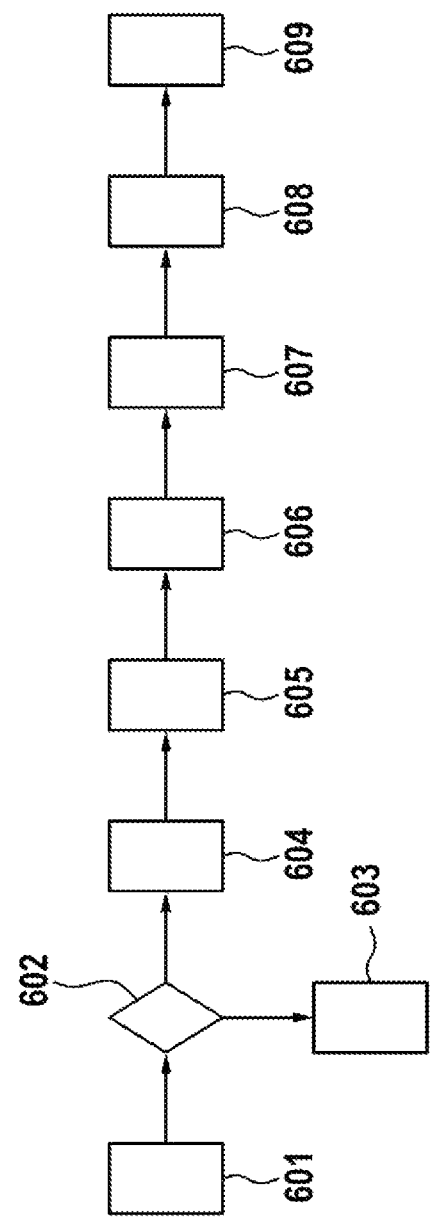
FIG. 6 a preferred embodiment of the method according to the disclosure as a block diagram.

FIGS. 5 to 7 now relate to the actual checking of the network component 120 by the checking modules 210. FIG. 5 relates to the case in which the check is performed at regular intervals of time in each case after a predetermined time interval has elapsed.

In step 501, the predetermined time interval elapses. By way of example, this time interval can be 24 hours, which means that a regular check is performed daily.

In step 502, both the audit module 211 and the log conditioning module 212 collect their respective information concerning the PLC 120. In step 503, the audit module 211 evaluates the respective information on the basis of the prescribed security guidelines. As the result of this evaluation, the audit module 211 determines whether or not there could be an attack. The log conditioning module 212 collects the applicable information from the log files of the PLC 120 in step 503 and conditions it in accordance with the prescribed configuration.

In step 504, the audit module 211 and the log conditioning module 212 transmit their results to the management module 230, which forwards these results to the communication module in step 505. In step 506, the communication module 220 transmits the results to the superordinate control unit 150, which further evaluates these results to ascertain whether there is actually an attack.

As an alternative or in addition to this regular automatic check, a check can also be performed in an unscheduled manner when triggered from outside. This case is depicted in FIG. 6.

In step 601, the control unit 150 to this end transmits a request to the communication module 220 to perform a check. In step 602, this request is checked by the management module 230. If the management module 230 determines that the request is inadmissible, said request is rejected in step 603 and returned to the control unit 150.

If the request is detected as admissible, the management module 230 transmits this request to the audit module 211 and the log conditioning module 212 in step 604.

The audit module 211 and the log conditioning module 212 then collect the applicable information, analogously to step 502, in step 605 and process it in step 606 analogously to step 503. In step 607, the modules 211 and 212 transmit their results to the management module 230, which forwards the results to the communication module 220 in step 608. In step 609, the communication module 220 transmits the results to the control unit 150 for further evaluation.

Further, the component monitoring unit is able to check the PLC 120 for attacks not at regular intervals of time and when triggered from outside; a check can in particular also be initiated when security-critical events occur. This case is depicted in FIG. 7.

In this case, the event module 213 checks in step 701 whether there is a security-critical event, for example whether there is an increased consumption of a memory unit of the PLC 120. If no such event is detected, the event module 213 can perform this check again after a prescribed checking interval has elapsed, indicated by reference sign 702.

If, on the other hand, an increased memory consumption is detected as a security-critical event, then the event module 213 collects information concerning this event in step 703, for example by virtue of the event module 213 requesting this information from the PLC 120 by means of a callback function or interprocess communication.

In step 704, the event module 213 transmits this information to the analysis module 214, which evaluates the information in step 705 and compares it with the prescribed security guidelines, for example, in order to rate whether there is or could be an attack. By way of example, the analysis module 214 can produce an alarm if a potential attack is detected.

The result of this evaluation is transmitted from the analysis module 214 to the management module 230 in step 706. This module 230 in turn transmits the result to the communication module 220 in step 707, said communication module then sending the result to the control unit 150 in step 708.

What is claimed is:

1. A method for detecting attacks on a network component of an industrial network using a component monitoring unit integrated in the network component, the method comprising:
    performing a check on the network component with at least one checking module of the component monitoring unit, the at least one checking module integrated in the network component;
    communicating with at least one further network component of the industrial network with a communication module of the component monitoring unit, the communication module integrated in the network component, the at least one further network component operably connected to the network component via a network distributor;
    managing communication within the network component between the at least one checking module and the communication module with a management module of the component monitoring unit, the management module integrated in the network component;
    when a predetermined criterion is satisfied, at least one of collecting information and evaluating information concerning at least one of the network component and the satisfied predetermined criterion with the at least one checking module to perform the check on the network component;
    transmitting, within the network component, a result of the performed check to the communication module via the management module with the at least one checking module; and
    transmitting the result from the communication module to the at least one further network component using the network distributor.

2. The method according to claim 1, further comprising:
    determining that the predetermined criterion is satisfied when (i) the communication module receives a request to perform the check on the network component via the network distributor, and (ii) the management module determines that the request is admissible; and
    transmitting, within the network component, the admissible request to the at least one checking module via the communication module to cause the at least one checking module to perform the check on the network component.

3. The method according to claim 1, further comprising:
    collecting information with an audit module of the at least one checking module for performing the check on the network component, the collected information concerning the network component.

4. The method according to claim 1, further comprising:
    collecting and conditioning information concerning the network component with a log conditioning module of the at least one checking module for performing the check on the network component, the information concerning the network component and the information obtained during a logging.

5. The method according to claim 1, further comprising:
    monitoring whether a security-critical event occurs with an event module of the at least one checking module;
    responding to an occurrence of the security-critical event with the event module by at least one of (i) collecting information concerning the security-critical event, and (ii) receiving the information concerning the network component; and
    evaluating the collected information concerning the security-critical event with an analysis module of the at least one checking module.

6. The method according to claim 1, further comprising:
    configuring at least one of the at least one checking module and the management module with a configuration module of the component monitoring unit.

7. The method according to claim 6, further comprising:
    storing configuration data in a configuration data module of the component monitoring unit; and
    configuring at least one of the at least one checking module and the management module based on the configuration data stored in the configuration data module with the configuration data module.

8. The method according to claim 7, further comprising:
    storing the configuration data in the configuration data module with the communication module.

9. The method according to claim 6, further comprising:
    managing a communication between the configuration module and the communication module with the management module;
    receiving a request to perform a configuration of the component monitoring unit along with applicable configuration data with the communication module;
    determining when the received request is admissible with the management module; and
    configuring at least one of the at least one checking module and the management module based on the received configuration data with the configuration module when the request is determined to be admissible.

10. The method according to claim 1, further comprising:
    at least one of (i) producing an alarm, (ii) creating an error log, and (iii) outputting a request to perform an audit when monitoring the network component.

11. The method according to claim 1, wherein:
    a computer program is configured to prompt the network component to perform the method, and
    the computer program is executed on the network component.

12. The method according to claim 11, wherein the computer program is stored on a non-transitory machine-readable storage medium of the network component.

13. The method according to claim 1, further comprising:
    performing the check on the network component when the connection to the network distributor is broken.

14. A network component for use in an industrial network including a network distributor, the network component comprising:
- a controller configured to run an embedded system; and
- a component monitoring unit integrated into the embedded system, the monitoring unit configured to detect attacks on at least the embedded system of the network component, the monitoring unit including at least one checking module, a communication module, and a management module,
- wherein the at least one checking module is configured to perform a check on at least the embedded system,
- wherein the communication module is configured to communicate with at least one further network component of the industrial network via a connection to the network distributor,
- wherein the management module is configured to manage communication within the network component between the at least one checking module and the communication module,
- wherein, when a predetermined criterion is satisfied, the at least one checking module is configured to at least one of collect information and evaluate information concerning at least one of the network component, the embedded system, and the satisfied predetermined criterion for checking the network component,
- wherein the at least one checking module is further configured to transmit, within the network component, a result of the performed check to the communication module via the management module, and
- wherein the communication module is configured to transmit the result to the at least one further network component of the industrial network using the network distributor.

15. The network component according to claim 14, wherein the at least one checking module is configured to perform the check on the embedded system when the connection to the network distributor is broken.

* * * * *